United States Patent Office 3,391,087
Patented July 2, 1968

3,391,087
HALOGEN-CONTAINING PHOSPHORIC ACID CATALYST AND METHOD OF PREPARING SAME
William G. Nixon, Clearwater, Fla., assignor to Universal Oil Products Company, Des Plaines, Ill., a corporation of Delaware
No Drawing. Continuation-in-part of application Ser. No. 350,682, Mar. 10, 1964. This application Nov. 17, 1966, Ser. No. 594,978
11 Claims. (Cl. 252—435)

ABSTRACT OF THE DISCLOSURE

Preparation of catalyst by impregnating a solid support with a phosphoric acid, heating to at least about 500° C., and thereafter heating to about 300–600° C. with hydrogen halide or ammonium halide to combine about 1.0–25% halogen with the hydroxyl groups of the acid, and the catalyst thus prepared.

---

This application is a continuation-in-part of my copending application Ser. No. 350,682, filed Mar. 10, 1964, now abandoned.

This invention relates to the manufacture of a novel hydrocarbon conversion catalyst and particularly to the manufacture of a novel hydrocarbon conversion catalyst comprising a solid phosphoric acid containing composite that has been chemically combined with a halogen derived from the hydrogen halides or ammonium halides so as to produce a novel catalytic composition of matter.

It is therefore an object of this invention to provide a method for preparing a novel hydrocarbon conversion catalyst. A further object of this invention is to provide a novel catalytic composition of matter.

One embodiment of this invention resides in a method for the preparation of a catalyst which comprises heating a solid phosphoric acid-containing composite with a hydrogen halide or an ammonium halide at a temperature of from about 300° C. to about 600° C. and chemically combining the halogen of said halide with the hydroxyl groups of the phosphoric acid in an amount of from about 1.0 to about 25% by weight.

A further embodiment of this invention resides in a catalyst consisting essentially of a solid phosphoric acid-containing composite having from about 1.0 to about 25% by weight of halogen in chemical combination with the hydroxyl groups of the phosphoric acid.

Other objects and embodiments will be found in the following further detailed description of the invention.

As hereinbefore set forth, the invention is concerned with a method for the preparation of a catalyst which possesses a high degree of hydrocarbon conversion activity in, for example, the isomerization of a cyclic paraffins, naphthenes, olefins and alkyl aromatics, the alkylation of alkylatable aromatic compounds with olefin-acting compounds and the polymerization of unsaturated organic compounds. The catalyst comprises a phosphoric acid-containing composite that is combined with a halogen to effect chemical combination of the hydroxyl group of phosphoric acid portion of said composite with said halogen. The composite, if desired, may comprise a high surface area solid support although it is one of the features of the catalyst of the present invention that low surface area supports such as alpha-alumina are satisfactory for the preparation of catalysts for use in the process of this invention.

As set forth hereinabove, the support may comprise a high surface area support. By the term high surface area is meant a surface area measured by surface adsorption techniques within the range of from about 25 to about 500 or more square meters per gram and preferably a support having a surface area of approximately 100 to 300 square meters per gram. However, as set forth hereinbefore, alpha-alumina, which is usually characterized by a surface area ranging from about 10 to about 25 square meters per gram is also a satisfactory support. Therefore, satisfactory supports for the preparation of catalyst for use in the process of this invention include high surface area crystalline alumina modifications such as gamma-, eta- and theta- alumina and low surface area supports such as alpha-alumina, although these are not necessarily of equivalent suitability. In addition to the aforementioned alpha-, gamma-, eta- and theta- aluminas which may be utilized as solid supports, it is also contemplated that other refractory oxides such as silica, zirconia, magnesia, thoria, etc. and combinations of refractory oxides such as silica-alumina, silica-magnesia, alumina-silica-magnesia, alumina-thoria, alumina-zirconia, etc. may also be utilized as solid supports for the catalyst of the present invention.

As set forth hereinabove, the catalyst comprises a phosphoric acid-containing composite that is combined with a halogen to effect chemical combination of the hydroxyl groups of the phosphoric acid portion of said composite with said halogen. The phosphoric acid-containing composite may be made by combining an acid of phosphorus such as ortho-, pyro-, or tetraphosphoric acid with the solid support. Orthophosphoric ($H_3PO_4$) and pyrophosphoric acid ($H_4P_2O_7$) find general application due mainly to the cheapness and to the readiness with which they may be procured although the invention is not restricted to their use, but may employ any of the other acids of phosphorus insofar as they are adaptable. However, it is not intended to infer that the different acids of phosphorus which may be employed will produce catalysts which have identical effects upon any given organic reactions as each of the catalysts produced from different acids any by slightly varying procedures will exert its own characteristic action.

Triphosphoric acids, which may be represented by the formula $H_5P_3O_{10}$, may also be used as one of the starting materials for the preparation of the composite utilized in the catalyst of this invention.

A phosphoric acid mixture which is generally referred to as polyphosphoric acid may also be employed in manufacturing the composite. Polyphosphoric acid is formed by heating orthophosphoric acid or pyrophosphoric acid or mixtures thereof in suitable equipment such as carbon lined trays heated by flue gases or other suitable means to produce a phosphoric acid mixture generally analyzing from about 79% to about 85% by weight of $P_2O_5$.

Tetraphosphoric acid, having the general formula $H_6P_4O_{13}$ which corresponds to the double oxide formula $3H_2O \cdot 2P_2O_5$ may be considered as the acid resulting when three molecules of water are lost by four molecules of orthophosphoric acid, $H_3PO_4$. The tetraphosphoric acid may be manufactured by gradual or controlled dehydration or heating of orthophosphoric acid and pyrophosphoric acid or by adding phosphorus pentoxide to these acids in proper amounts.

The phosphoric acid-containing composite utilized in the present invention may contain from about 8% or lower to about 80% by weight of phosphoric acid, and preferably from about 10% to about 50% by weight of phosphoric acid. Prior art solid phosphoric acid catalytic composites usually contain from about 50 to about 75% by weight of phosphoric acid composited with the solid carrier (such as Mavity U.S. Patent No. 2,584,102) since lower acid contents cause the solid phosphoric acid catalytic composite to suffer from a hydrocarbon conversion activity standpoint while those with too high a content of phosphoric acid have poor structural strength. Solid phosphoric acid catalytic composites have been manufactured by prior art methods with from about 15% to about 75% by weight of phosphoric acid but compression pressure ranging from about 5,000 to about 50,000 pounds per square inch during the manufacturing process have been found necessary to give the catalyst increased structural strength.

It is therefore a feature of the present invention that the phosphoric acid-containing composite utilized in the present invention may contain less than about 50% by weight of phosphoric acid without causing the hydrocarbon conversion activity of the finished catalyst to suffer and without the need for subjecting the composite to high compression pressures during manufacture in order to give the catalyst increased structural strength inasmuch as the finished catalyst of the present invention prepared as hereinafter set forth has increased structural strength and a high degree of stability due to the immobility of the components of the finished catalyst inasmuch as chemical combination of the phosphoric acid portion of the compositive with the halogen is accomplished as hereinafter described.

Halogens which may be chemically bound to the phosphoric acid portion of the phosphoric acid-containing composite may be incorporated therein in any suitable manner. However, the halogen must be added in a form which will readily chemically react with the phosphoric acid portion of said phosphoric acid-containing composite in order to obtain the desired catalytic composite. Therefore, halogen may be added as fluorine, chlorine, bromine and/or iodine but in view of the fact that halogens per se are generally difficult to handle, it generally is preferable to utilize a halogen derived from the group consisting of hydrogen halides such as hydrogen fluoride, hydrogen chloride, hydrogen bromide and/or hydrogen iodide and ammonium halides such as ammonium fluoride, ammonium chloride, ammonium bromide and/or ammonium iodide. In any case, following the chemical combination of the halogen with the hydroxyl groups of the phosphoric acid portion of the phosphoric acid-containing composite, the composite is heat treated. Heat treating the composite after chemical reaction of the halogen with the phosphoric acid-containing composite will drive off, for example, ammonia if an ammonium halide is utilized thereby allowing the halogen to remain impregnated on and chemically bonded to the phosphoric acid portion of the phosphoric acid-containing composite.

The catalyst of the present invention therefore comprise a halogen chemically combined with the phosphoric acid portion of the composite so as to effect chemical combination of the hydroxyl groups of the phosphoric acid with the halogen, and as hereinbefore set forth, it is the particular association of these components which results in the unusual catalytic properties of the catalyst.

The chemical addition of the halogen to the phosphoric acid portion of the phosphoric acid-containing composite will enhance the surface area characteristics of the composite inasmuch as the finished catalytic composite exhibits greater surface area than the phosphoric acid-containing composite originally possessed. Further, the final catalytic composite obtained by the preparation as described hereinabove is substantially anhydrous due to the chemical combination of the halogen with the phosphoric acid-containing portion of the composite. Thus, it is another feature of the present invention that a substantially anhydrous support initially is not necessary to prepare the catalyst of the present invention. Still another feature of the present invention is that the final catalytic composite does not need hydration during processing as does a phosphoric acid-containing composite as is taught in the prior art (such as Mavity U.S. Patent No. 2,584,102) inasmuch as the final catalytic composite of my invention is substantially anhydrous and thus deterioration of a physical nature by processing factors tending to further dry the catalyst is not a problem in the present invention.

As hereinbefore set forth, certain forms of alumina may be utilized as supports for the catalyst of this invention. For example, alumina may be prepared by any of the well known suitable means of manufacture, one example of which is the addition of an alkaline reagent to a salt of aluminum in an amount sufficient to form aluminum hydroxide, which, upon drying and calcining, is converted to alumina. Similarly, if the solid support comprises both alumina and silica, these components may be prepared by separate, successive or coprecipitate means.

For example, a phosphoric acid-containing composite previously prepared by the methods hereinabove set forth is then chemically combined with a halogen such as the halogen derived from treating the composite with ammonium chloride, said ammonium chloride being added in an amount sufficient to allow the finished catalytic composite to contain from about 1.0 to about 25% or more by weight of halogen. Following this, the chemically combined material is then heat treated in a furnace tube or muffle furnace or the like. The finished catalytic composite comprising the halogen chemically combined with the phosphoric acid portion of the phosphoric acid-containing composite is then utilized as the hydrocarbon conversion catalyst.

The following examples are introduced for the purpose of illustration only with no intention of unduly limiting the generally broad scope of the present invention.

Example I

In this example, polyphosphoric acid is treated with ammonium hydroxide to a pH of approximately 9.0 and this solution is impregnated on the solid support, namely gamma-alumina. The impregnated support is then heated in a furnace tube to a temperature of about 500° C. and maintained at this temperature for a period of about 2 hours while heat treating the composite. During the heat treatment of the composite to the desired temperature, it will be noted that ammonia gas is evolved from the composite thereby leaving phosphoric acid deposited on the refractory oxide support. This phosphoric acid-containing composite containing approximately 50% by weight of phosphoric acid is then subjected to chemical reaction at a temperature in the range of from about 300° C. to about 600° C. with a halogen derived from hydrogen chloride. The finished catalyst will contain about 8.0 weight percent of chloride. This catalyst is designated as catalyst A.

Example II

Another catalyst is prepared by impregnating silica with another polyphosphoric acid-ammonium hydroxide solution. The impregnated support is then heat treated in a furnace tube to a temperature of above 500° C. and kept thereat for a period of about 2 hours. It is noted that ammonia gas is evolved from the composite thereby leaving phosphoric acid deposited on the refractory oxide support. This phosphoric acid-containing composite containing approximately 30% by weight of phosphoric acid is then subjected to chemical reaction with a halogen derived from ammonium chloride. The resultant composite is again slowly heat treated in the furnace tube to about 600° C. and once again the evolution of ammonia gas takes place leaving the halogen chemically combined with the phosphoric acid portion of the silica support. This catalyst is designated as catalyst B.

Example III

Yet an other catalyst is prepared by impregnating silica with another polyphosphoric acid-ammonium hydroxide solution. The impregnated support is then heat treated in a furnace tube to a temperature of about 500° C. and kept thereat for a period of about 2 hours. It is noted that ammonia gas is evolved from the composite thereby leaving phosphoric acid deposited on the refractory oxide support. This phosphoric acid-containing composite containing approximately 25% by weight of phosphoric acid is then subjected to chemical reaction with a halogen derived from ammonium bromide. The resultant composite is again slowly heat treated in the furnace tube to about 500° C. and chemical combination of the halogen and the phosphoric acid portion of the silica support occurs. This catalyst is designated as catalyst C.

Example IV

In this example, a catalyst is prepared by impregnating alumina with another polyphosphoric acid-ammonium hydroxide solution. The impregnated support is then heat treated in a furnace tube to a temperature of about 500° C. and kept thereat for a period of about 2 hours. It is noted that ammonia gas is evolved from the composite thereby leaving phosphoric acid deposited on the refractory oxide support. This phosphoric acid-containing composite containing approximately 38% by weight of phosphoric acid is then subjected to chemical reaction with a halogen derived from ammonium floride. The resultant composite is again slowly heat treated in the furnace tube to about 600° C. and again the evolution of ammonia gas takes place leaving the halogen chemically combined with the phosphoric acid protion of the alumina support. This catalyst is designated as catalyst D.

I claim as my invention:

1. A method for the preparation of a catalyst which comprises impregnating a solid support with a phosphoric acid, heating the phosphoric acid-containing composite at a temperature at least about 500° C. to deposit the acid on the support and thereafter heating with a hydrogen halide or an ammonium halide at a temperature of from about 300° to about 600° C. and chemically combining the halogen of said halide with the hydroxyl groups of the phosphoric acid in an amount of from about 1.0 to about 25% by weight.

2. The method of claim 1 further characterized in that said halide is hydrogen chloride.

3. The method of claim 1 further characterized in that said halide is hydrogen fluoride.

4. The method of claim 1 further characterized in that said halide is hydrogen bromide.

5. The method of claim 1 further characterized in that said halide is ammonium chloride.

6. The method of claim 1 further characterized in that said halide is ammonium fluoride.

7. A catalyst prepared by impregnating a solid support with a phosphoric acid, heating the phosphoric acid-containing composite at a temperature at least about 500° C. to deposit the acid on the support and thereafter heating with a hydrogen halide selected from the group consisting of hydrogen fluoride, hydrogen bromide and hydrogen iodide at a temperature of from about 300° C. to about 600° C. and chemically combining the halogen of said halide with the hydroxyl groups of the phosphoric acid in an amount of from about 1.0 to about 25% by weight.

8. The catalyst of claim 7 further characterized in that said hydrogen halide is hydrogen fluoride.

9. The catalyst of claim 7 further characterized in that said hydrogen halide is hydrogen bromide.

10. A catalyst prepared by impregnating a solid support with a phosphoric acid, heating the phosphoric acid-containing composite at a temperature at least about 500° C. to deposit the acid on the support and thereafter heating wih an ammonium halide at a temperature of from about 300° C. to about 600° C. and chemically combining the halogen of said halide with the hydroxyl groups of the phosphoric acid in an amount of from about 1.0 to about 25% by weight.

11. The catalyst of claim 10 further characterized in that said ammonium halide is ammonium fluoride or ammonium chloride.

References Cited

UNITED STATES PATENTS

| | | | |
|---|---|---|---|
| 2,409,247 | 10/1946 | Brooks et al. | 260—683.15 |
| 2,428,741 | 10/1947 | Plank | 252—435 |
| 2,584,102 | 2/1952 | Mavity | 252—435 |
| 2,596,497 | 5/1952 | Mavity | 252—435 |
| 2,843,640 | 7/1958 | Langlois et al. | 252—437 |
| 2,938,874 | 5/1960 | Rosinski | 252—437 |
| 3,213,034 | 10/1965 | Drehman | 252—435 |

DANIEL E. WYMAN, *Primary Examiner.*

PAUL E. KONOPKA, *Assistant Examiner.*